US012793731B2

(12) United States Patent
Zhang et al.

(10) Patent No.: US 12,793,731 B2
(45) Date of Patent: Nov. 10, 2026

(54) NEURAL NETWORK-BASED METHOD FOR PLAYBACK VOCAL AND MUSIC CANCELLATION IN HANDS-FREE KARAOKE SYSTEMS

(71) Applicant: Tencent America LLC, Palo Alto, CA (US)

(72) Inventors: Hao Zhang, Columbus, OH (US); Meng Yu, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 139 days.

(21) Appl. No.: 18/775,236

(22) Filed: Jul. 17, 2024

(65) Prior Publication Data

US 2026/0024540 A1 Jan. 22, 2026

(51) Int. Cl.

| | |
|---|---|
| ***G10L 21/0232*** | (2013.01) |
| ***G10L 25/18*** | (2013.01) |
| ***G10L 25/30*** | (2013.01) |
| *G10L 21/0216* | (2013.01) |

(52) U.S. Cl.

CPC .......... *G10L 21/0232* (2013.01); *G10L 25/18* (2013.01); *G10L 25/30* (2013.01); *G10L 2021/02163* (2013.01)

(58) Field of Classification Search

CPC ..... G10L 21/0232; G10L 25/18; G10L 25/30; G10L 2021/02163

USPC .......................................................... 704/202

See application file for complete search history.

(56) References Cited

U.S. PATENT DOCUMENTS

| | | | | |
|---|---|---|---|---|
| 10,332,495 | B1 | 6/2019 | Mortensen et al. | |
| 11,250,833 | B1 * | 2/2022 | Bajic | G10K 11/17875 |
| 12,272,369 | B1 * | 4/2025 | Chhetri | H04M 9/08 |
| 12,507,005 | B2 * | 12/2025 | Zhang | G06N 3/09 |
| 2006/0034447 | A1 * | 2/2006 | Alves | H04M 9/082 379/406.01 |
| 2019/0096419 | A1 | 3/2019 | Giacobello | |
| 2024/0371389 | A1 * | 11/2024 | Mosayyebpour Kaskari | G10L 21/0232 |
| 2025/0054479 | A1 * | 2/2025 | Chen | H04R 1/406 |

(Continued)

FOREIGN PATENT DOCUMENTS

| | | |
|---|---|---|
| CN | 115083431 A | 9/2022 |

OTHER PUBLICATIONS

Zhang et al.; Deep Adaptive AEC: Hybrid of Deep Learning and Adaptive Acoustic Echo Cancellation; Proc. ICASSP, 2022, pp. 756-760.*

(Continued)

*Primary Examiner* — Sudhanshu C Pathak

(74) *Attorney, Agent, or Firm* — Sughrue Mion, PLLC

(57) ABSTRACT

A method and apparatus comprising computer code configured to cause a processor or processors to receive an audio signal obtained from a microphone, input the audio signal into frequency-domain Kalman filter (FDKF), input the audio signal and an output from the FDKF into a neural network, estimate, based on the audio signal and the output from the FDKF, and removing feedback signals from the audio signal by the neural network, and output a version of the audio signal in which a target vocal signal is enhanced by removal of the feedback signals from the audio signal by the neural network.

11 Claims, 14 Drawing Sheets

1100

(56) References Cited

U.S. PATENT DOCUMENTS

2025/0203282 A1* 6/2025 Heitkaemper .......... G10L 25/30

OTHER PUBLICATIONS

Revach et al.; KalmanNet: Neural Network Aided Kalman Filtering for Partially Known Dynamics;2022.*

Yang et al.; Low-Complexity Acoustic Echo Cancellation with Neural Kalman Filtering; 2022.*

Written Opinion dated Jun. 24, 2025 in International Application No. PCT/US2025/023428.

International Search Report dated Jun. 24, 2025 in International Application No. PCT/US2025/023428.

Zhang, Y et al. 'Neural Network Augmented Kalman Filter for Robust Acoustic Howling Suppression'. arXiv, Electrical Engineering and Systems Science, Audio and Speech Processing; Web. Sep. 27, 2023 [retrieved on May 27, 2025]; URL: [https://arxiv.org/abs/2309.16049].

Hao Zhang et al: "Hybrid AHS: A Hybrid of Kalman Filter and Deep Learning for Acoustic Howling Suppression", Arxiv.org Cornell University Library, 201 Olin Library Cornell University Ithaca, NY 14853, May 4, 2023, XP091501611.

Meng Yu et al: "NeuralEcho: A Self-Attentive Recurrent Neural Network For Unified Acoustic Echo Suppression And Speech Enhancement", Arxiv.org Cornell University Library, 201 Olin Library Cornell University Ithaca, NY 14853, May 20, 2022, XP091230086.

Halimeh Mhd Modar et al: "Combining Adaptive Filtering And Complex-Valued Deep Postfiltering For Acoustic Echo Cancellation", ICASSP 2021—2021 IEEE International Conference On Acoustics, Speech and Signal Processing (ICASSP) IEEE, Jun. 6, 2021, pp. 121-125, XP033955155.

EP 25 80 4962 Extended European Search Report—EESR issued Aug. 24, 2026.

* cited by examiner

FIG. 7

700

```
Algorithm  Streaming inference process.
procedure STREAMING((y, r) → ŝ)                         ▷ r: reference signal
    Initialization: y_buffer, r_buffer, load DNN model: f(·)
    Parameters: Delay: Δt, gain: G, nonlinearity: NL(·)
    while m ≤ M do                       ▷ M is the total number of frames
        ŝ_m ← f(y_buffer, r_buffer)               ▷ Get output at frame m
        ŝ ← ŝ_m                                    ▷ Save to final output
        x_{m+1} ← Delayed_ŝ_m · G                 ▷ Get loudspeaker signal
        d_{m+1} ← NL(x_{m+1}) * h                    ▷ Get next playback
        y_buffer ← d_{m+1} + s_{m+1} + n_{m+1}            ▷ Update input
        r_buffer ← y_buffer                     ▷ Update reference signal
    end while
    return ŝ                                ▷ The streaming output is ŝ
end procedure
```

1000

1100

1200

NEURAL NETWORK-BASED METHOD FOR PLAYBACK VOCAL AND MUSIC CANCELLATION IN HANDS-FREE KARAOKE SYSTEMS

BACKGROUND

1. Field

The present disclosure pertains to the field of audio signal processing, including methods and systems for enhancing audio quality in hands-free Karaoke systems.

2. Description of Related Art

Hands-free Karaoke systems present a challenging acoustic environment due to the presence of various interferences, including background music, playback vocals, and inevitable background noise.

One of the critical issues in hands-free Karaoke systems is the suppression of background music played through loudspeakers, which is essentially an acoustic echo cancellation (AEC) problem. Effective AEC is crucial to prevent the music from interfering with the vocal performance and being re-captured by the microphone. Additionally, the amplified vocal playback can lead to acoustic howling if not adequately suppressed, making acoustic howling suppression (AHS) another vital component. Moreover, background noise must be suppressed to maintain the quality of the vocal performance. The combination of these requirements—AEC, AHS, de-noising (DN), and DR—creates a complex audio processing challenge. Traditional signal processing techniques alone are insufficient to address these multifaceted issues effectively.

Current neural network methods for speech enhancement typically focus on directly estimating and enhancing target vocals. While these approaches can improve vocal clarity, they often fail to handle the accompanying music and playback vocals effectively. This limitation can result in inadequate suppression of background music and playback vocals, leading to distortions and artifacts in the enhanced target signal, i.e., suboptimal performance in hands-free Karaoke systems. These methods also struggle with the simultaneous requirements for echo cancellation, howling suppression, and noise reduction, further complicating the acoustic environment.

And for any of those reasons there is therefore a desire for technical solutions to such problems that arose in computer audio technology.

SUMMARY

There is included a method and apparatus comprising memory configured to store computer program code and a processor or processors configured to access the computer program code and operate as instructed by the computer program code. The computer program is configured to cause the processor implement receiving code configured to cause the at least one processor to receive an audio signal obtained from a microphone; inputting code configured to cause the at least one processor to input the audio signal into frequency-domain Kalman filter (FDKF); further inputting code configured to cause the at least one processor to input the audio signal and an output from the FDKF into a neural network; estimating code configured to cause the at least one processor to estimate, based on the audio signal and the output from the FDKF, and remove feedback signals from the audio signal by the neural network; and outputting code configured to cause the at least one processor to output a version of the audio signal in which a target vocal signal is enhanced by removal of the feedback signals from the audio signal by the neural network.

The audio signal may be obtained from the microphone in a hands-free Karaoke environment.

The output from the FDKF may be a version of the audio signal in which acoustic feedback cancellation (AFC) is implemented by iterative feedback to the FDKF in which the target vocal signal is estimated by short-time Fourier transform (STFT) and used by the FDKF to update filter weights of the FDKF.

The FDKF may further, in outputting the output from the FDKF, implement STFT on the audio signal and an error signal estimated based on the target vocal signal.

The neural network may implements a neural network adaptive feedback cancellation (NNAFC) based on STFT domain versions of the audio signal, the output from the FDKF, and a reference music signal.

The NNAFC may include a two-layer Long Short-Term Memory (LSTM) network configured to estimate and suppress music and playback components in the audio signal based on at least two ratio masks.

At least one of the at least two ratio masks may receive an output from another of the at least two ratio masks.

BRIEF DESCRIPTION OF THE DRAWINGS

Further features, nature, and various advantages of the disclosed subject matter will be more apparent from the following detailed description and the accompanying drawings in which:

FIG. 7 is a simplified illustration of aspects of streaming inference in accordance with embodiments;

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
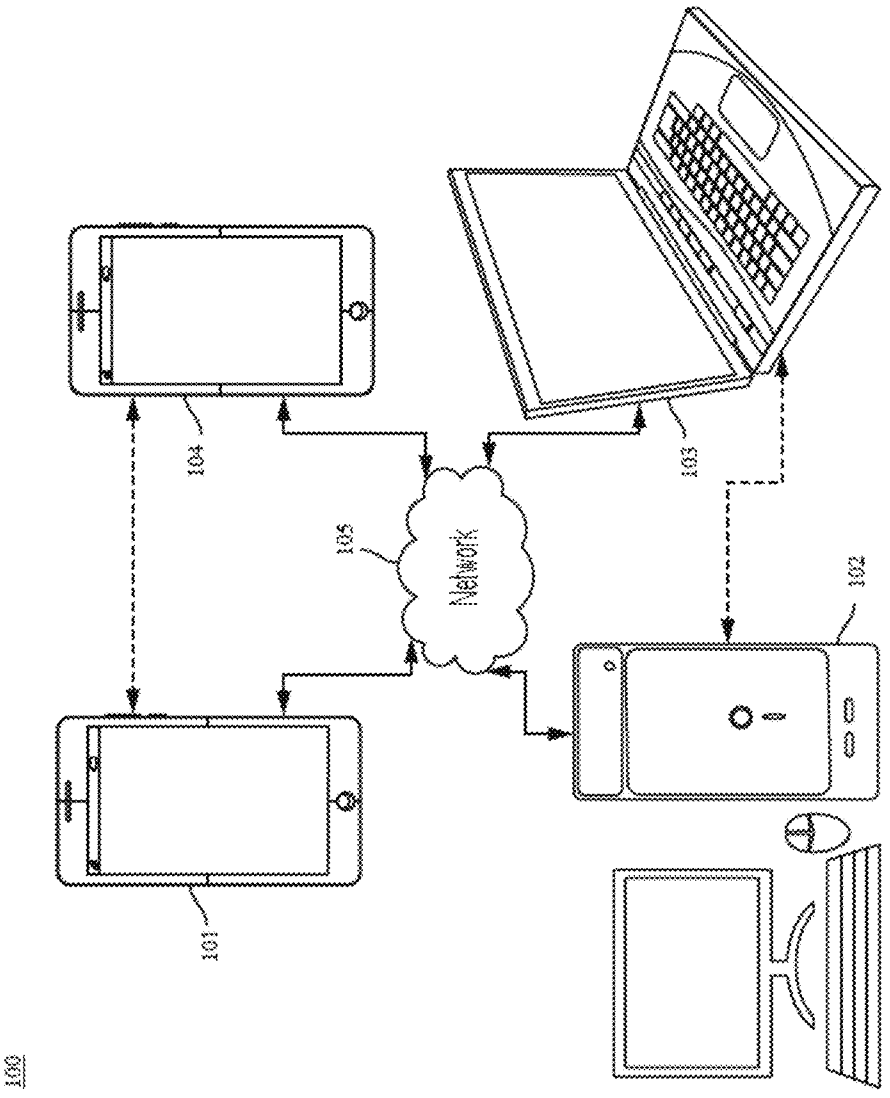
FIG. 1 is a schematic illustration including networked devices in accordance with embodiments of the disclosure.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Embodiments herein may be applied in such environments, such as 2 or more dimensional video conferencing, or hearing aids or karaoke environments or theatre environments or the like that may experience acoustic howling.

More particularly, embodiments herein address the combined challenges of acoustic echo cancellation, acoustic howling suppression, noise reduction. The methods according to embodiments utilize a hybrid approach that integrates traditional frequency-domain Kalman filter (FDKF) techniques with advanced neural network (NN) based methods to achieve superior audio clarity and stability. This innovative solution is designed to improve the overall user experience in hands-free Karaoke systems by effectively managing the complex interplay of various acoustic artifacts and enhancing the quality of the reproduced sound.

In greater detail, the ultimate goal of howling suppression is to attenuate the playback signal and send only the target signal to the loudspeaker, which, in that sense, is similar to embodiments that regard acoustic echo cancellation (AEC).

Considering that deep learning is powerful at modeling complex nonlinear relationships and has been successfully introduced to suppress acoustic echo, embodiments herein employ deep learning to also serve as a powerful alternative to address AHS problems such as prior inability of deep learning in treating howling as a type of noise for speech enhancement rather even if suppressing howling in a streaming and recurrent manner.

According to embodiments herein, aspects of what may be referred to as "Deep AHS" are utilized to address howling suppression. That is, AHS may be viewed herein as a supervised learning problem with the overall task to maintain only the target signal while suppressing the playback signal and background noise in a microphone recording. Considering that a playback signal and a target signal are highly correlated, embodiments herein may use a concatenation of temporal correlation ("corr."), frequency correlation, and channel covariance ("cov.") of input signals as feature and train an attention based recurrent neural network to estimate a complex ratio filter of the target signal.

Embodiments consider acoustic howling suppression (AHS) as a supervised learning problem and provide a deep learning approach, called Deep AHS, to address it. Deep AHS is trained in a teacher forcing way which converts the recurrent howling suppression process into an instantaneous speech separation process to simplify the problem and accelerate the model training. Ones of the disclosed embodiments utilize trained or training of an attention based recurrent neural network to extract the target signal from the microphone recording, thus attenuating the playback signal that may lead to howling. Different training strategies are utilized for one or more embodiments and a streaming inference method implemented in a recurrent mode used to evaluate the performance of the proposed method for real-time howling suppression. Deep AHS avoids howling detection and intrinsically prohibits howling from happening, allowing for more flexibility in the design of audio systems. Experimental results show the effectiveness of the disclosed embodiments for howling suppression under different scenarios.

To overcome challenges described herein, there is disclosed herein embodiments regarding a novel hybrid method that combines traditional frequency-domain Kalman filter (FDKF) techniques with advanced neural network (NN) based methods. This integrated approach leverages the strengths of both traditional and modern techniques, providing a robust solution for enhancing audio quality in hands-free Karaoke systems. By addressing the joint problems of acoustic echo cancellation, howling suppression, and noise reduction, this invention aims to deliver a superior user experience, ensuring clear and stable audio output in hands-free Karaoke environments.

Figure 2:
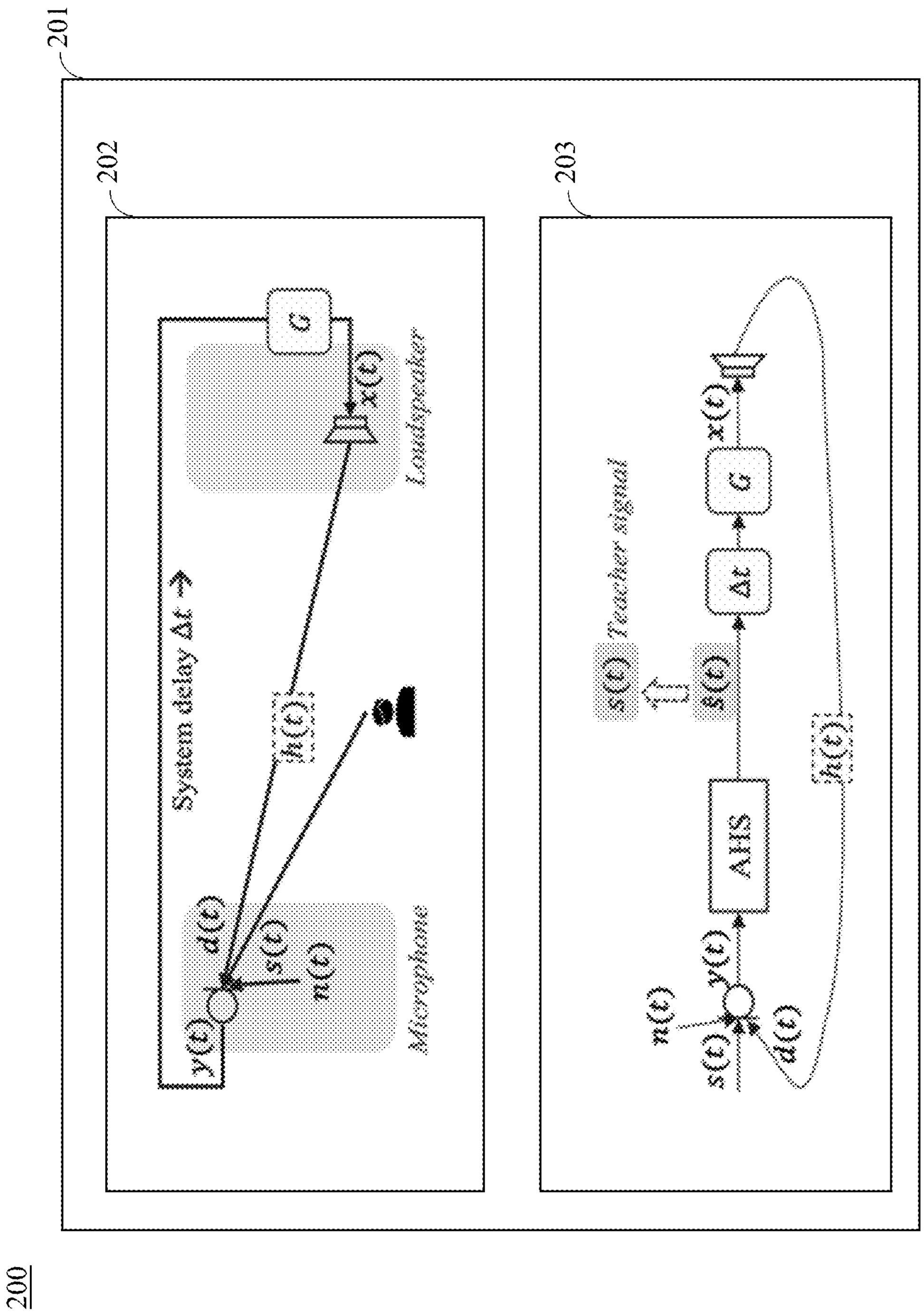
FIG. 2 is a simplified block diagram of an acoustic amplification system in accordance with embodiments.

FIG. 2 illustrates an example 200 of a single-channel acoustic amplification system 201 with a microphone and a loudspeaker coupled in the same space 202. The target speech is picked up by the microphone as s(t), which is then sent to the loudspeaker for acoustic amplification. The loudspeaker signal x(t) is played out and arrives at the microphone as a playback signal denoted as d(t):

$$d(t) = NL(x(t)) * h(t) \qquad \text{Eq. (1)}$$

where NL(.) denotes the nonlinear distortion introduced by the loudspeaker, h(t) represents the acoustic path from loudspeaker to microphone, and * denotes linear convolution.

FIG. 2 also illustrates the signal flow 203 of an acoustic howling suppression system according to embodiments herein. For example, if without any processing, the loudspeaker signal x(t) will be a delayed and amplified version of y(t), and this playback signal d(t) will re-enter the pickup repeatedly, the corresponding microphone signal at time index t can be represented as:

$$y(t) = s(t) + n(t) + NL[y(t - \Delta t) \cdot G] * h(t) \quad \text{Eq. (2)}$$

where n(t) represents the background noise, Δt denotes the system delay from microphone to loudspeaker, and G the gain of amplifier. The recursive relationship between y(t) and y(t−Δt) causes re-amplifying of playback signal and leads to a feedback loop that results in an annoying, high-pitched sound, which is known as acoustic howling.

With that being said, howling is generated in a recurrent manner rather than instantaneously. That is, howling starts as multiple playback signals and gradually forms a shrill sound after being amplified to a certain extent.

As a note acoustic howling is different from acoustic echo even though inappropriately handled acoustic echo (leakage) could also result in howling. Major differences between acoustic howling and acoustic echo include that both are essentially playback signals, while howling is generated gradually, and the playback signal that leads to howling is generated from the same source as that of the target signal whereas acoustic echo is usually generated from a different source (far-end speaker), which makes the suppression of howling more challenging.

Figure 3:
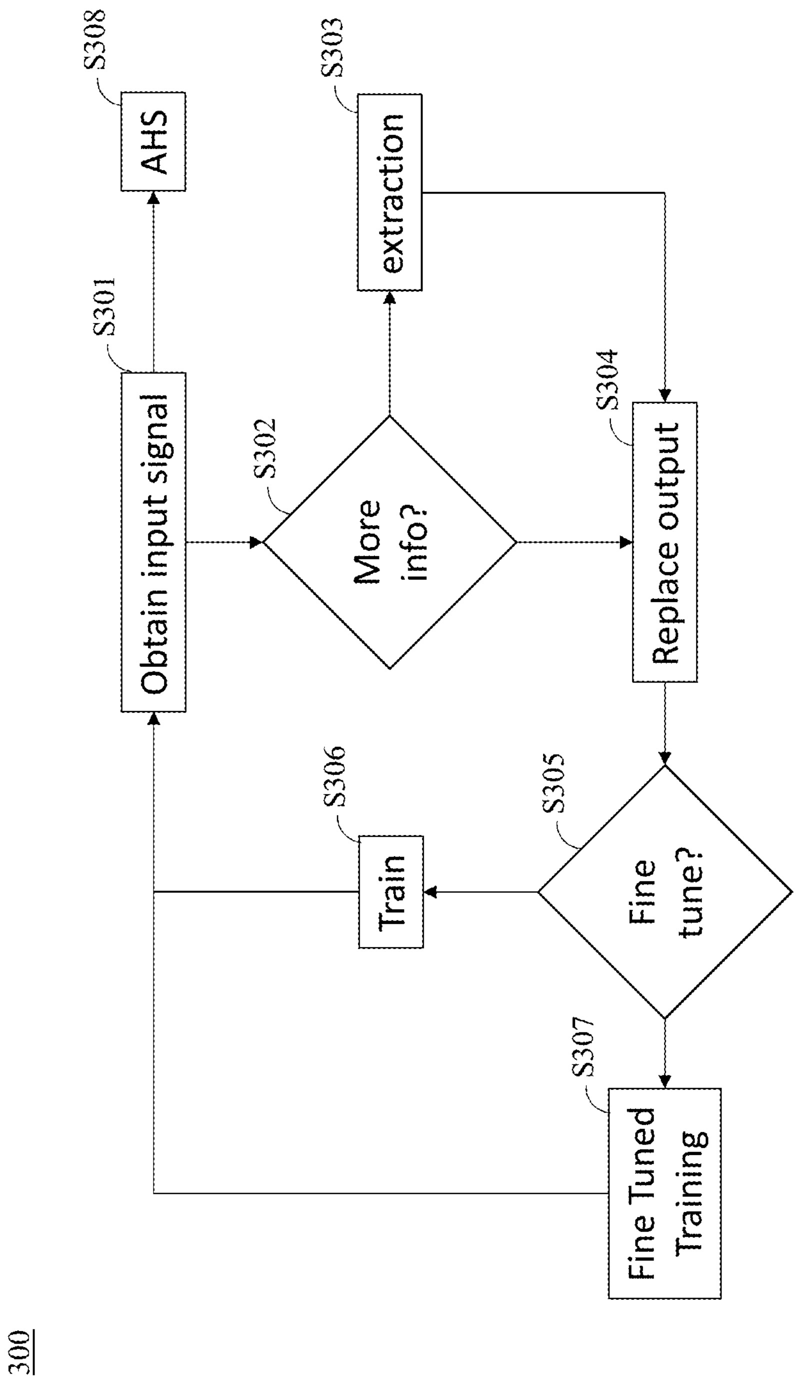
FIG. 3 is a simplified illustration of howling suppression learning in accordance with embodiments.

FIG. 3 represents an example flowchart 300 regarding an embodiment of teacher-forced learning for howling suppression. Ideally, if the AHS method can always perfectly process microphone recording and completely attenuates the playback component in it before sending it to the loudspeaker, there will be no howling problem under any circumstances. From the speech separation point of view, it seems that AHS can be seen as a speech separation problem where the target signal s(t) is a source to be separated from the microphone signal, which is similar to the idea of how deep learning based AEC is formulated.

However, to achieve howling suppression using deep learning considering the characteristics of acoustic howling, a most crucial problem is that howling is generated adaptively, and the current input depends on the previous outputs. Specifically, the existence of distortion/leakage in the current processed signal as shown in signal flow 203, will affect the playback signal received at the microphone in the next loop d(t+Δt). Ideally, there may be training of a deep learning model in an adaptive way by updating its parameters on a sample level. However, this requires a huge amount of computation and is hard to be realized in real applications.

As such, embodiments herein employ Deep AHS to train a model for howling suppression using teacher-forced learning. Assuming that once the model is properly trained, it should attenuate the playback signal in the microphone and send only target speech to the loudspeaker. During model training, embodiments take the target speech, s(t), as the teacher signal to replace the actual output ŝ(t) in the subsequent computation of the network, as shown in signal flow 203.

By using teacher forced learning, the playback signal d(t) is then a determined signal influenced only by s(t), and the repeating summation of multiple playback signals in Eq. (2) can be simplified to a one-time playback. The corresponding microphone signal for model training can be written as:

$$y(t) = s(t) + n(t) + NL[s(t - \Delta t) \cdot G] * h(t) \quad \text{Eq. (3)}$$

The microphone signal during teacher forced learning is a mixture of the target signal, background noise, and a determined one-time playback signal. And the overall problem can thus be formulated as a speech separation problem. Training Deep AHS in a teacher-forced learning way not only simplifies the overall problem but also possible to diminish the uncertainty introduced in the adaptive process of AHS and results in a robust howling suppression solution.

According to exemplary embodiments, different training strategies have been explored according to embodiments herein. An example of a straightforward embodiment is to directly use the microphone signal in Eq. (3) as input at S301 and set the corresponding s(t) as the training target at S304. Such training strategy may be employed as the model trained at S306 without using a reference signal ("w/o Ref").

Another embodiment involves extracting more information at S302 from input and using that additional extracted information as a reference signal during model training. Therefore, embodiments use a delayed microphone signal as additional input at S303 with the amount of delay estimated during an initial stage. Considering that the playback signal can be regarded as a delayed, scaled, nonlinear version of s(t), using a delayed microphone signal helps the model to better differentiate the target signal from playback. Such embodiment of a training strategy may be referred to as "w Ref".

In addition, there may be situations where there is always a mismatch during offline training and real-time application considering the leakage existed in ŝ(t). To incorporate the mismatch and better approximate the real scenarios, embodiments employ another strategy that works by fine-tuning at S305 and S307 the model using pre-processing signals, denoted as "Fine-tuned". Then, the microphone signal for offline training is a modified version of Eq. (3):

$$y'(t) = s(t) + d'(t) + n(t) \quad \text{Eq. (4)}$$

where d'(t) is the distorted playback signal generated using estimated target ŝ(t−Δt). To be specific, there may be pre-processing of all the training data using a pre-trained model and then the enhanced output may be fed through the audio system to get the corresponding playback d'(t).

Finally, there may be fine-tuning of the model using y'(t) as input. As such, the mismatch mentioned previously would be reduced slightly given that the model has seen the distortion during training.

By any of the above-described embodiments, AHS may be achieved, to varying degrees, at S308 depending on one or more of those embodiments.

Figure 4:
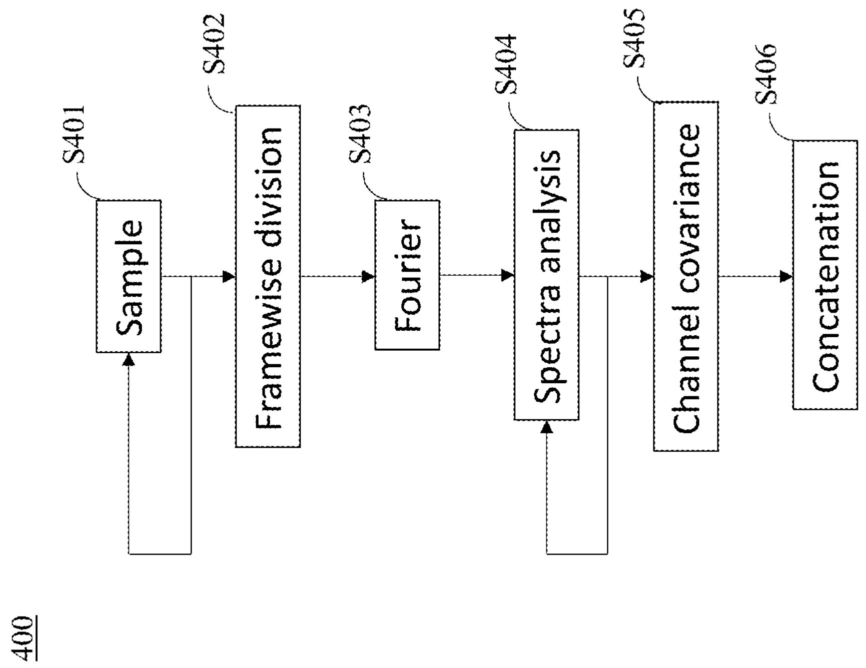
FIG. 4 is a simplified illustration of aspects of acoustic network structures in accordance with embodiments.
Figure 5:
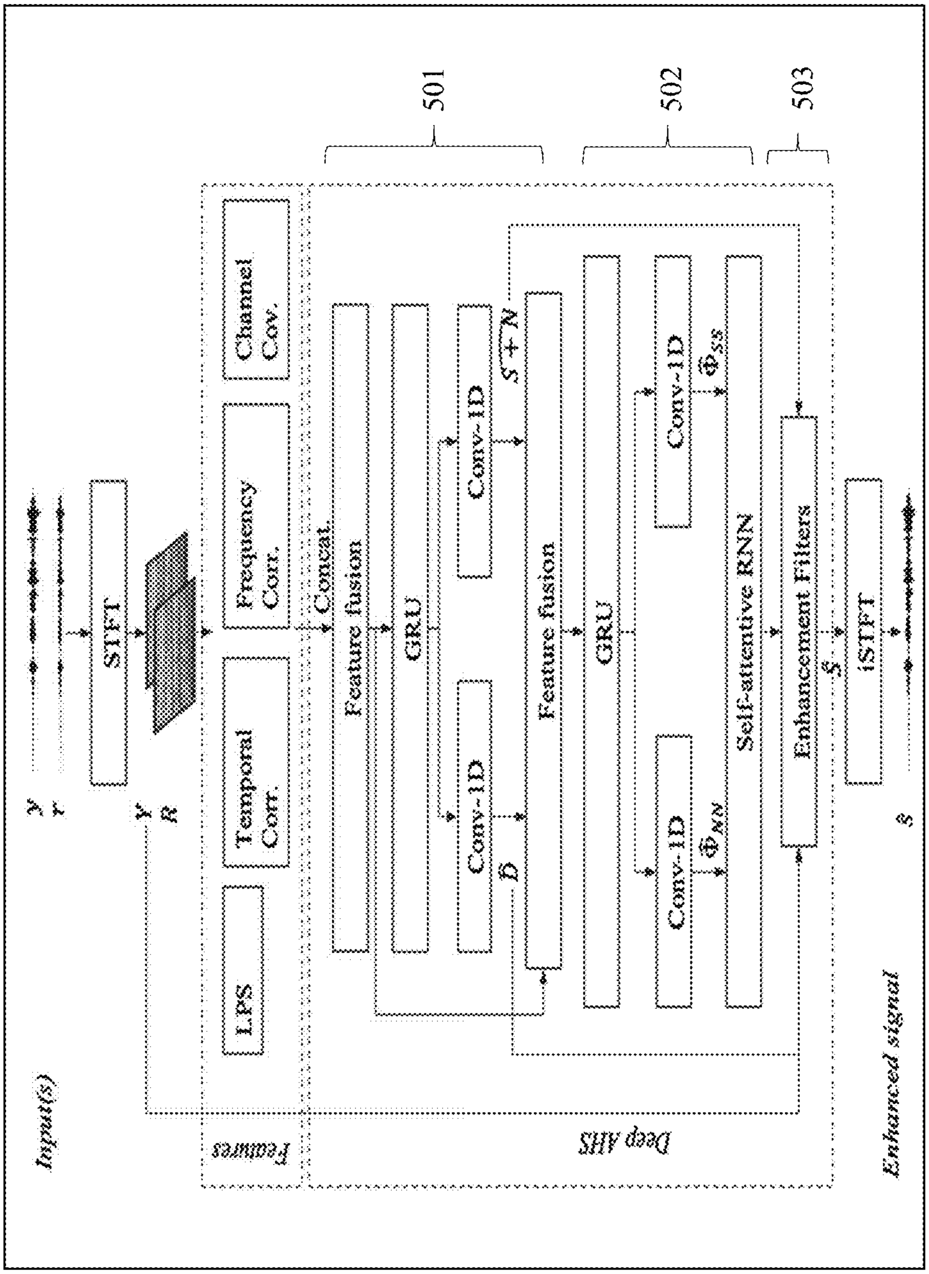
FIG. 5 is a simplified illustration of aspects of acoustic network structures in accordance with embodiments.

Details of a network structure are illustrated and described with the example 500 of FIG. 5 and the flowchart 400 of FIG. 4. The microphone signal y(t) and reference signal r(t), sampled at 16 k Hz at S401, are firstly divided into 32-ms frames with 16 ms frameshift at S402. A 512-point short-time Fourier transform (STFT) is then applied at S403 to each frame, resulting in the frequency domain inputs, Y(m, f) and R(m, f), with frame index m and frequency index f, respectively. Then a normalized log-power spectra (LPS) may be calculated at S404 along with a correlation matrix across time frames and frequency bins of microphone (log $(|Y|^2)$, $\Phi^T$_Y, $\Phi^F$_Y) and reference signals (log$(|R|^2)$, $\Phi^T$_R, $\Phi^F$_R), respectively, as input features. Where $\Phi^T$_* and $\Phi^F$_* are used to capture the signals' temporal and frequency dependency, which helps discriminate between howling and tonal components. Channel covariance of input signals $\Phi^{C}$ is calculated at S405 as another input feature to account for cross-correlation between them. A concatenation of these features is used at S406 for model training with a linear layer for feature fusion.

Figure 6:
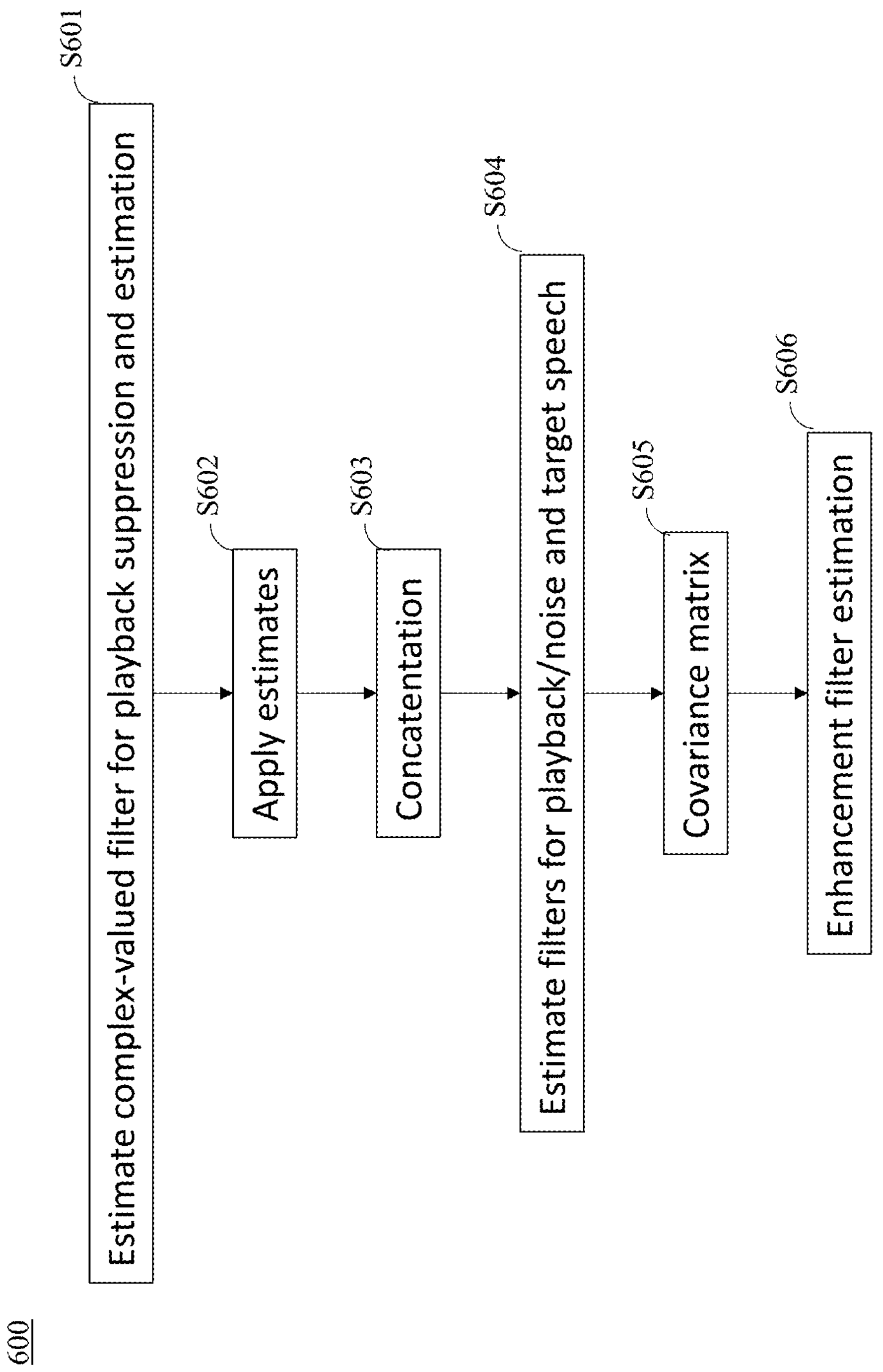
FIG. 6 is a simplified flow diagram of an architecture of howling suppression in accordance with embodiments.

FIG. 6 illustrates a flowchart 600 regarding an architecture of Deep AHS for howling suppression according to embodiments of the disclosure. For example, as shown in example 500, the network consists of three parts, where the first part 501 employs a gated recurrent unit (GRU) layer with 257 hidden units and two 1D convolution layers to estimate a complex-valued filter for playback suppression and playback estimation, respectively, at S801. The estimates are then applied at S602 on the microphone signal Y to obtain the corresponding outputs, denoted as $\widehat{S+N}$ and $\hat{D}$.

The LPS of these outputs, together with the fused feature for the first part, are concatenated at S603 and fused to serve as the inputs for the second part 502. Another GRU layer and two 1D convolution layers are utilized to estimate two filters for estimating the playback/noise and target speech from input channels Y, $\widehat{S+N}$, and $\hat{D}$. The covariance matrix of playback/noise $\hat{\Phi}_{NN}$ and target speech $\hat{\Phi}_{SS}$ are then calculated at S606 for the third part 503.

The third part 503 is for enhancement filter estimation, which is motivated by the idea of multi-channel signal processing. Embodiments regard the input Y and two estimates $\widehat{S+N}$, and $\hat{D}$ as three-channel inputs and train a self-attentive RNN to estimate the speech enhancement filters $W \in \mathbb{C}^{F \times T \times 3}$. These filters are then applied on the input channels to get the enhanced target speech ŝ. Finally an inverse STFT (iSTFT) is used to get waveform ŝ(t).

The loss function for model training is defined as a combination of scale-invariance signal-to-distortion ratio (SI-SDR) in the time domain and mean absolute error (MAE) of spectrum magnitude in the frequency domain:

$$\text{Loss} = -SI - SDR(\hat{s}, s) + \lambda\, MAE(|\hat{S}|, |S|) \quad \text{Eq. (5)}$$

where λ is set to 10,000 to balance the value range of the two losses.

Since there may always be a mismatch between the offline training and inference stage of Deep AHS. A streaming inference method, in which the output of the processor is looped back and added to the input in the following time steps, is therefore implemented to evaluate the performance of Deep AHS in a realistic and recurrent mode. Details of this streaming inference are shown in the example 700 of FIG. 7.

As such, embodiments of this disclosure provide for a deep learning approach to acoustic howling suppression. The embodiments address AHS by extracting the target signal from microphone recording using an attention based recurrent neural network with properly designed features. With the idea of teacher-forced learning, the Deep AHS model is trained offline using teacher signals and evaluated in both offline and streaming manners to show its performance for howling suppression.

The technical contribution of embodiments of this disclosure is fourfold. Firstly, Deep AHS formulates howling suppression, an adaptive procedure, as a supervised learning problem with the help of teacher-forced learning. It is fundamentally different from traditional AHS methods and does not require howling detection. Secondly, with such a training strategy, a streaming inference method is implemented to evaluate the performance of Deep AHS in a recurrent manner. Thirdly, Deep AHS is robust to nonlinear distortions and can achieve howling and noise suppression jointly under different scenarios, which allows for higher loop gain and brings flexibility to the design of an audio system. Lastly, multiple training strategies have been investigated for howling suppression.

Embodiments of this disclosure regard acoustic howling suppression (AHS) as a supervised learning problem and employ a deep learning approach, called Deep AHS, to address it. Deep AHS is trained in a teacher forcing way which converts the recurrent howling suppression process into an instantaneous speech separation process to simplify the problem and accelerate the model training. The embodiments utilizes properly designed features and trains an attention based recurrent neural network to extract the target signal from the microphone recording, thus attenuating the playback signal that may lead to howling. Different training strategies are investigated and a streaming inference method implemented in a recurrent mode used to evaluate the performance of the proposed method for real-time howling suppression. Deep AHS avoids howling detection and intrinsically prohibits howling from happening, allowing for more flexibility in the design of audio systems. Experimental results show the effectiveness of the proposed method for howling suppression under different scenarios.

Figure 8:
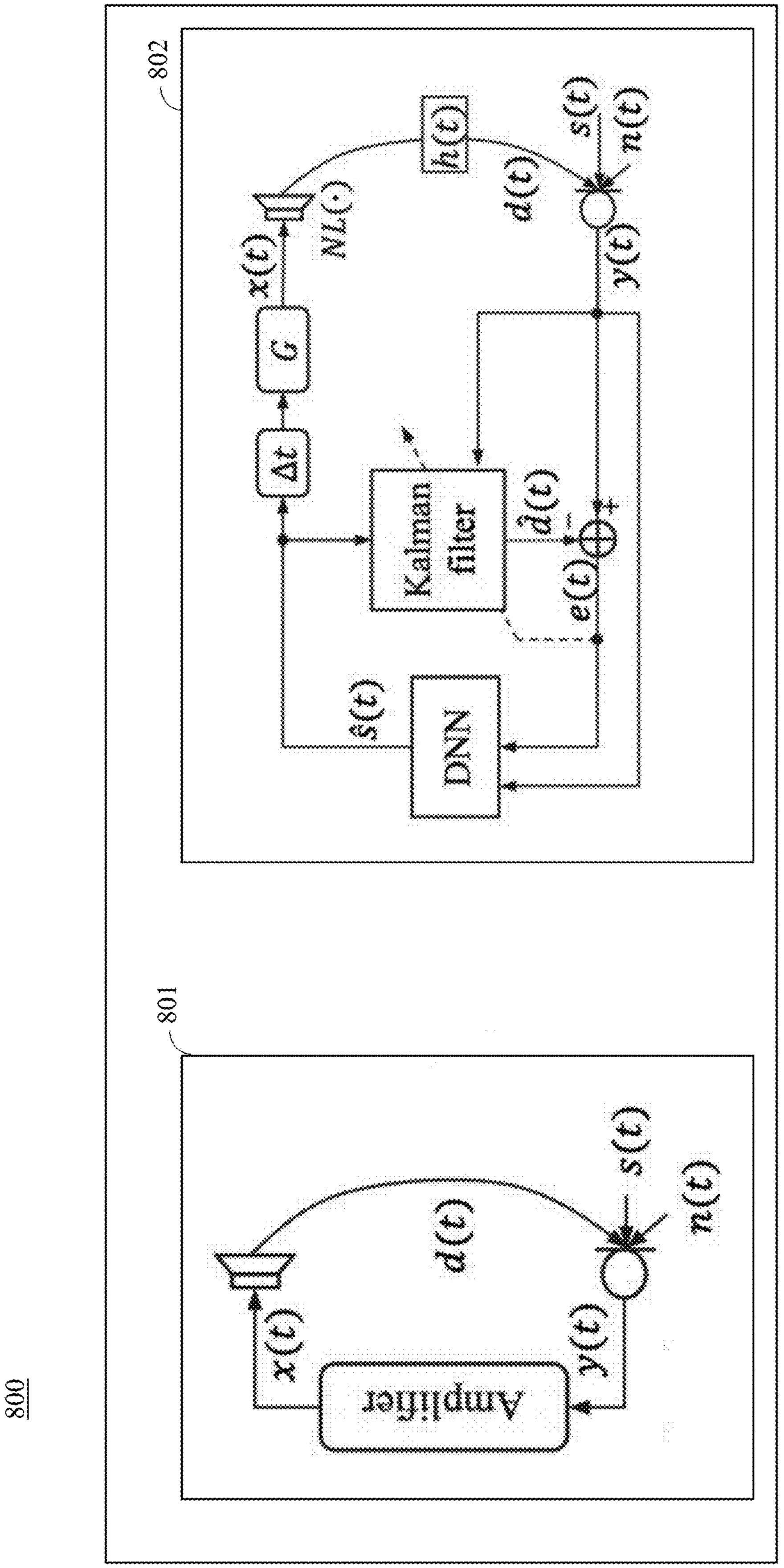
FIG. 8 is a simplified flow diagram of an acoustic amplification system in accordance with embodiments.

FIG. 8 is a signal diagram example 800 of an acoustic amplification system 801 according to embodiments of the present disclosure.

As shown in FIG. 8, acoustic amplification system 801 includes of a microphone and a loudspeaker where the target speech is picked up by the microphone as s(t), which is then sent to the loudspeaker for acoustic amplification. The loudspeaker signal x(t) is played out and arrives at the microphone as an acoustic feedback denoted as d(t):

$$d(t) = NL(x(t)) * h(t) \quad \text{Eq. (6)}$$

where NL(.) denotes the nonlinear distortion introduced by the loudspeaker, h(t) represents the acoustic path from loudspeaker to microphone, and * denotes linear convolution.

When the signal is not processed, the playback signal d(t) will re-enter the pickup repeatedly, the corresponding microphone signal can then be represented as:

$$y(t) = s(t) + n(t) + NL[y(t - \Delta t) \cdot G] * h(t) \quad \text{Eq. (7)}$$

where n(t) represents the background noise, Δt denotes the system delay from microphone to loudspeaker, and G the gain of amplifier. The recursive relationship between y(t) and y(t−Δt) causes re-amplifying of playback signal and leads to a feedback loop that results in an annoying, high-pitched sound, which is known as acoustic howling.

While acoustic howling and acoustic echo are two distinct phenomena, inappropriate handling of acoustic echo can result in howling. The primary differences between these two phenomena are (1) while both of them are fundamentally playback signals, howling is characterized by a gradual buildup of signal energy in a recursive manner and (2) the signal that leads to howling is generated by the same source as the target signal, making the suppression of howling more challenging.

According to an embodiment, suppressing howling may be achieved by incorporating the AHS method within the acoustic loop considering the recursive nature of howling. However, there may be some drawbacks of this embodiment—it may be computationally demanding and may be inefficient for deep learning based methods.

To address these challenges, embodiments of the present disclosure adopts a teacher-forcing training strategy to formulate AHS as a speech separation problem during model training.

FIG. 8 also illustrated an acoustic amplification system 802 according to embodiments of the present disclosure for hybrid acoustic howling suppression based on a frequency filter model and a deep neural network.

According to this embodiment, the assumption is that the Hybrid AHS model, once properly trained, can attenuate interferences and transmit only the target speech to the loudspeaker, and consequently, the actual output $\widehat{s(t)}$ in FIG. 8 may be replaced with the ideal target (teacher signal) s(t) during model training, and the recursively defined microphone signal in Eq. (7) is converted into a mixture of target signal, background noise, and an one-time playback signal determined by s(t):

$$y(t) = s(t) + n(t) + NL[s(t-\Delta t)\cdot G] * h(t) \qquad \text{Eq. (8)}$$

Thus, the overall task of AHS is then transformed into a speech separation problem during offline training. The object is to extract the target signal s(t) from the ideal microphone signal, defined in Eq. (8) and exclusively employed for model training, using the Kalman filter output e(t) as an additional input, thus jointly suppressing howling and noise.

The Kalman filter model/module may utilize microphone signal y(t) and the enhanced signal ŝ(t) as a reference (denoted as r(t)) to obtain an estimate of the acoustic path ĥ(t) and the corresponding feedback d(t). The estimated feedback may then be subtracted from the microphone signal, and the resulting error signal e(t) may be employed for filter weight updating. The overall process may be viewed as a two-step procedure (prediction and updating) with Kalman filter weights updated through the iterative feedback from the two steps.

In the prediction step, the near-end signal is estimated as:

$$E(k) = Y(k) - R(k)\hat{H}(k) \qquad \text{Eq. (9)}$$

where E, Y, and R are the short-time Fourier transform (STFT) of e(t), y(t), and r(t) respectively, and k denotes the frame index. Ĥ(k) denotes the frequency-domain estimated echo path.

The echo path Ĥ(k) is updated in the updating step:

$$\hat{H}(k+1) = A\left[\hat{H}(k) + K(k)E(k)\right] \qquad \text{Eq. (10)}$$

where A is the transition factor. K(k) denotes the Kalman gain, which is obtained using covariances calculated from state estimation error, observation and process noises.

Acoustic howling is a phenomenon stems from positive feedback within the audio system itself, often caused by the amplified sound output from the loudspeaker being picked up by the microphone and subsequently re-amplified. This results in an uncontrolled positive feedback loop, leading to the undesirable amplification of specific frequency components and the generation of a sustained and unpleasant howling sound. It is commonly observed in systems like hearing aids, public addressing system, and karaoke. The presence of howling not only poses a threat to the functionality of the equipment but also poses potential risks to human hearing system. Acoustic howling suppression (AHS) refers to the process of reducing or eliminating the occurrence of acoustic howling.

Many methods have been proposed for acoustic howling suppression (AHS), including gain control, frequency shift, notch filter, and adaptive feedback cancellation (AFC) according to embodiments. Among them, the AFC method employs adaptive filters such as Kalman filter to estimate and cancel the howling signal by continuously updating filter coefficients based on the detected feedback, making them a powerful approach for AHS over other methods. However, AFC methods are sensitive to control parameters and inadequate in feedback systems with nonlinear distortions.

To alleviate those technical deficiencies in the technology, embodiments herein provide a novel method to tackle the challenge of mismatch and fully exploit the potential of deep learning in AHS. Embodiments adopt a new training paradigm, recursively training the NN module to establish consistency between training and inference stages and eliminate the mismatch problem. During the training stage, embodiments integrate the neural network (NN) module into the acoustic loop, generating signals online in a recursive manner. This training methodology circumvents the mismatch problem encountered in prior NN based AHS methods, leading to enhanced performance and improved robustness.

Aspects of the disclosure represent the introduction of a novel approach that combines traditional Kalman filter-based adaptive feedback cancellation (AFC) with neural network (NN) techniques to address the complex acoustic challenges in hands-free Karaoke systems. This hybrid approach leverages the strengths of both traditional signal processing and modern machine learning to enhance audio quality.

A primary purpose of such embodiments is to enhance audio clarity and quality in karaoke systems by effectively canceling out feedback signals without significantly affecting the original vocal tracks. This method preserves the integrity of the original speech, which is crucial for maintaining a natural and enjoyable karaoke experience. By ensuring that the target vocal signal remains clear and natural, the invention provides a significant improvement over existing methods.

Figure 9:
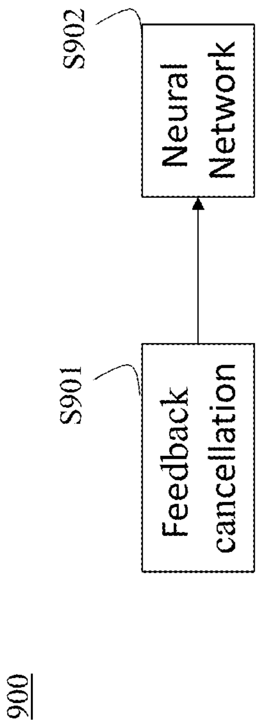
FIG. 9 is a simplified illustration of a suppression strategy in accordance with embodiments.

As in the example 900 of FIG. 9, embodiments may first, at S901, employ a frequency-domain Kalman filter (FDKF) for initial feedback cancellation. This step targets both background music and playback vocals, providing a rough estimate of the target vocal signal. This initial processing effectively reduces the primary sources of interference, setting the stage for more refined enhancement.

The output from the FDKF at S901, which is a preliminary estimate of the target vocal signal, is then fed, at S902, into a neural network. Alongside the microphone signal, this input allows the neural network to be trained to estimate an anechoic version of the target vocal. The neural network module is specifically designed for the hands-free Karaoke system to perform progressive and gradual suppression of interferences, making it highly suitable for this task.

As such, embodiments herein use neural networks to estimate feedback signals and then subtracts them from the microphone input. This two-stage suppression strategy ensures effective interference reduction while maintaining the quality of the original vocal.

This innovative combination provides a comprehensive solution that not only handles initial feedback cancellation effectively but also enhances the target vocal signal through sophisticated neural network processing. The result is a significant improvement in audio clarity and stability, offering a superior user experience in hands-free Karaoke environments.

Figure 10:
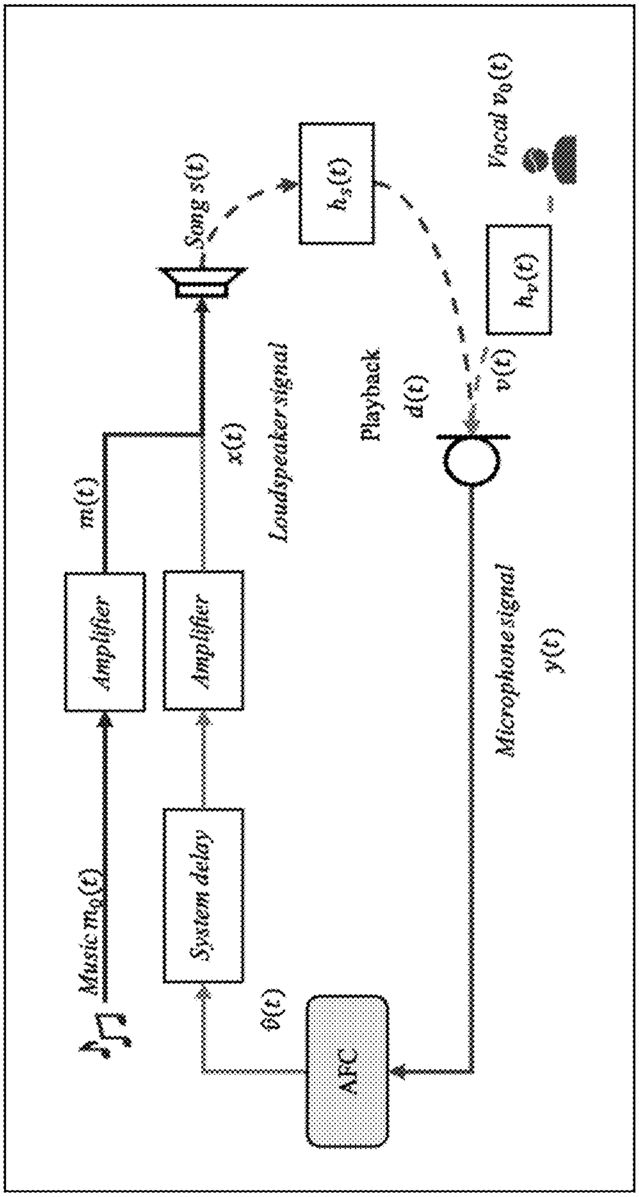
FIG. 10 is a simplified illustration of aspects of a karaoke system in accordance with embodiments.

A hands-free karaoke system according to embodiments is shown in the example 1000 of FIG. 10. For simplicity, embodiments may ignore background noise for now in the problem formulation, and then the microphone picks up not only the vocal of the singer, but also the playback song d(t):

$$y(t) = v(t) + d(t) \quad \text{Eq. (11)}$$

Where:

$$v(t) = v_0(t) * h_v(t) \quad \text{Eq. (12)}$$

Here $v_0(t)$ are the source vocal from the singer/user and s(t) is the song played out by the loudspeaker. And $h_v(t)$, $h_s(t)$ denote the acoustic paths from the singer/user and the loudspeaker to the microphone. Meanwhile, the song signal is a mixture of the background music m(t) and vocal sent to loudspeaker x(t). If not processed properly, the vocal picked up by microphone will be played back and picked up again by the microphone, resulting in an acoustic loop and recursively amplifying of the vocal signal. To some extent, it will results in acoustic howling, which is unpleasant to listen to and may affect users auditory health and be harmful to the device.

To guarantee user experience, embodiments herein may require that the x(t) should be an estimate of the target vocal signal with the playback vocal and playback music components in the microphone recording cancelled out. Techniques like adaptive feedback cancellation (AFC) is usually utilized to address this problem according to embodiments. It takes the microphone signal as input to estimate the playback signal, then subtract it from the microphone signal to get an estimate of the vocal signal, denoted as $\hat{v}(t)$. Which is then sent through the system with unavoidable system delay introduced, and sent to the microphone for amplification. The corresponding loudspeaker signal is:

$$x(t) = m(t) + [\hat{v}(t - \Delta t) \cdot G] \quad \text{Eq. (13)}$$

where G is the loudspeaker gain and Δt denotes the delay between the microphone and the loudspeaker introduced by the system.

According to embodiments, frequency-domain Kalman filter (FDKF) based AFC estimates the feedback signal by modeling the acoustic path with an adaptive filter W(k) (k denotes the frame index). FDKF can be understood as a two-step process, where the iterative feedback from these steps drives the update of filter weights.

In the prediction step, the target vocal signal is estimated as the error signal of the system, $$E(k) = Y(k) - X(k)\hat{W}(k) \quad \text{Eq. (14)}$$

where E(k), Y(k), and X(k) are the short-time Fourier transform (STFT) of the estimated target signal, microphone, and error signal respectively. Note that in traditional Kalman filter, embodiments utilize loudspeaker signal X(k) as the reference signal. $\hat{W}$(k) denotes the estimated echo path in the frequency domain.

In the update step, the state equation for updating acoustic path $\hat{W}$(k) is defined as, $$\hat{W}(k+1) = A\left[\hat{W}(k) + K(k)E(k)\right] \quad \text{Eq. (15)}$$

where A is the transition factor. K(k) denotes the Kalman gain. K(k) is related to the reference signal signal X(k), echo path $\hat{W}$(k−1) and estimated vocal signal, i.e., error signal, E(k−1).

The calculation of K(k) is defined as, $$K(k) = P(k)X^H(k)\left[X(k)P(k)X^H(k) + \Psi_{vv}(k)\right]^{-1} \quad \text{Eq. (16)}$$

$$P(k+1) = A^2\left[I - \frac{1}{2}K(k)X(k)\right]P(k) + \Psi_{\Delta\Delta}(k) \quad \text{Eq. (17)}$$

where P(k) is the state estimation error covariance. $\Psi_{vv}$(k) and $\Psi_{\Delta\Delta}$(k) are observation noise covariance and process noise covariance respectively and are approximated by the covariance of the estimated near-end signal $\Psi_{\hat{s}\hat{s}}$(k) and the echo-path $\Psi_{\hat{W}\hat{W}}$(k), respectively, in traditional Kalman filter:

$$\Psi_{vv}(k+1) = 0.9\Psi_{vv}(k) + 0.1|E(k)|^2 \quad \text{Eq. (18)}$$

$$\Psi_{\Delta\Delta}(k+1) = 0.9\Psi_{\Delta\Delta}(k) + 0.1(1 - A^2)\left|\hat{W}(k)\right|^2 \quad \text{Eq. (19)}$$

Figure 11:
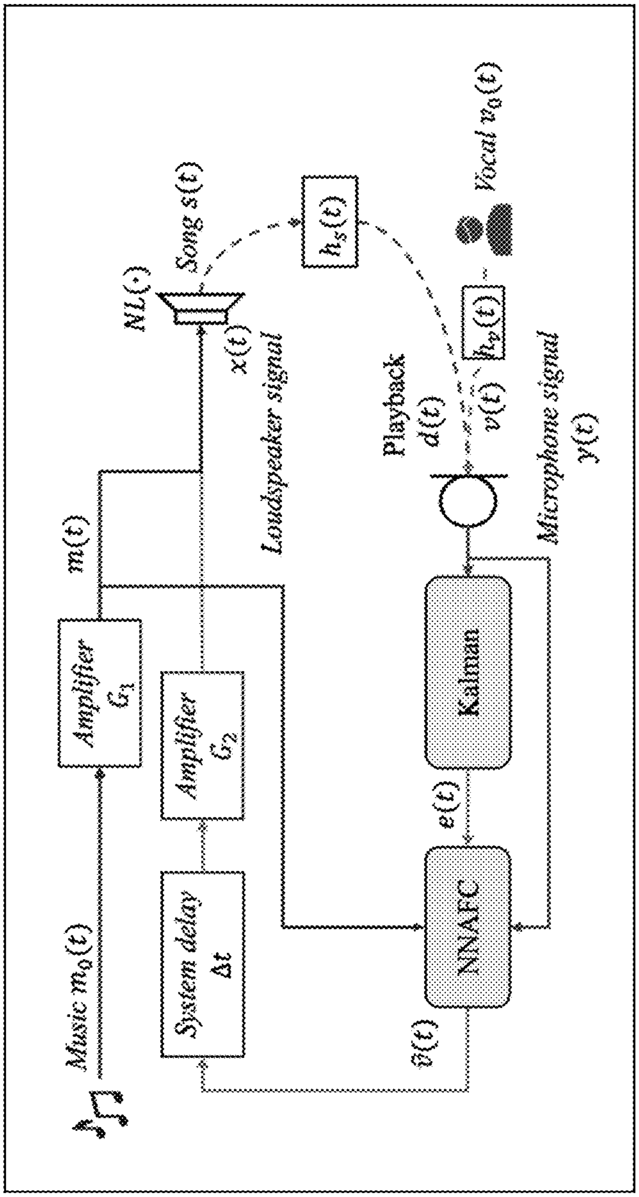
FIG. 11 is a simplified illustration of aspects of a karaoke system in accordance with embodiments.

According to embodiments, as in example 1100 of FIG. 11, the output of the Frequency-Domain Kalman Filter (FDKF), together with the reference music signal and the microphone signal, are converted to the Short-Time Fourier Transform (STFT) domain and sent to the Neural Network Adaptive Feedback Cancellation (NNAFC) module for gradual feedback suppression.

Figure 12:
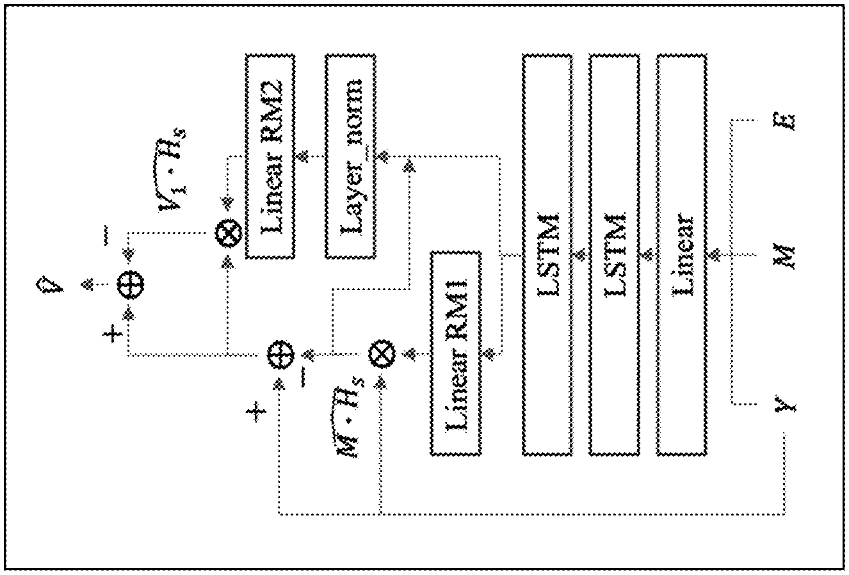
FIG. 12 is a simplified illustration of aspects of a neural network adaptive feedback cancellation in accordance with embodiments.

A detailed network structure of the NNAFC module according to exemplary embodiments is provided in example 1200 of FIG. 12. It is a two-layer Long Short-Term Memory (LSTM) network designed to estimate and suppress both the music and playback vocal components in the microphone signal using two ratio masks.

Figure 13:
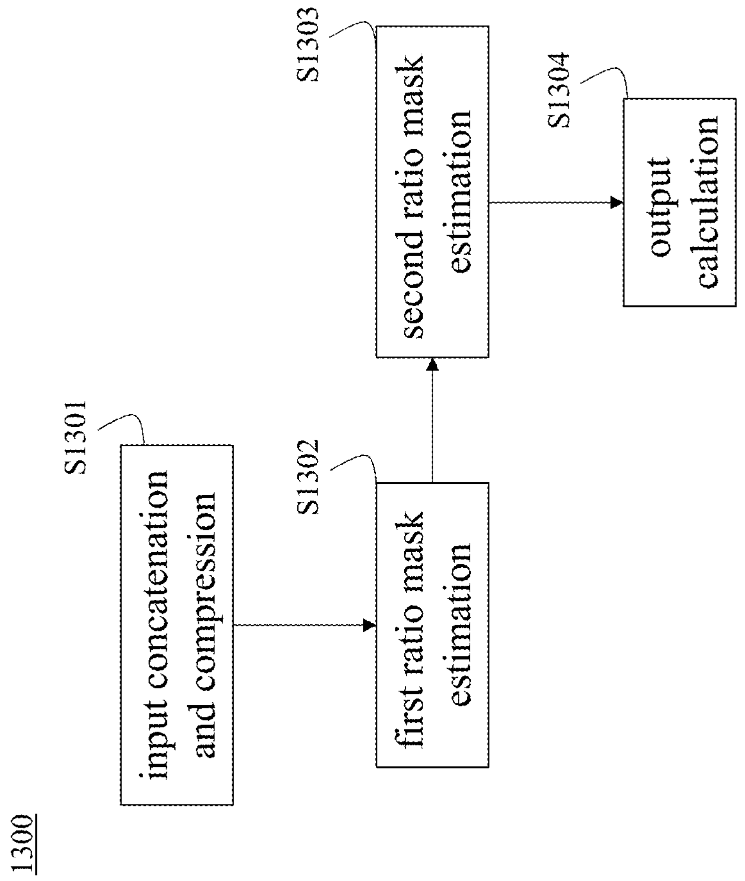
FIG. 13 is a simplified illustration of aspects of the acoustic system in accordance with embodiments.

Viewing FIG. 12 and also the example 1300 of FIG. 13, there is provided, at S1301, input concatenation and compression in which, according to embodiments, the STFT domain inputs (output of FDKF, reference music signal, and microphone signal) are concatenated together and passed through a linear layer for feature compression.

And at S1302, according to embodiments, there is provided LSTM processing, in which compressed feature is then sent to the two-layer LSTM network. And at S1303, there is, according to embodiments, a first ratio mask estimation, in which the output of the LSTM is passed through a linear layer to estimate the first ratio mask (RM1). This ratio mask is then multiplied with the microphone signal to get an estimate of the music components in it:

$$\widehat{MH_s} = RM1 \cdot Y \quad \text{Eq. (20)}$$

And at S1303, according to embodiments, there is provided a second ratio mask estimation in which the estimated music component $\widehat{MH_s}$ is then concatenated with the output of the LSTM and passed through layer normalization and another linear layer to estimate the second ratio mask (RM2). This ratio mask (RM2) is multiplied with the residual signal to estimate the playback vocal component. Here the residual signal is obtained by subtracting the estimated music component from the microphone signal, therefore, the estimated payback vocal is obtained as:

$$\widehat{V_1 H_s} = RM2 \cdot (Y - \widehat{MH_s}) \quad \text{Eq. (21)}$$

Where $v_1(t)$ is the vocal signal sent to the loudspeaker, ideally, if the AFC module could perfectly suppress feedback, this vocal signal received at the loudspeaker should be a delayed and amplified version of the vocal signal:

$$v_1(t) = Gv(t - \Delta t) \quad \text{Eq. (22)}$$

And at S1304, according to embodiments, there is provided the final output of the NNAFC is obtained by subtracting the estimated music and playback vocal components from the microphone signal:

$$\hat{V} = Y - \widehat{MH_s} - RM2 \cdot (Y - \widehat{MH_s}) \quad \text{Eq. (23)}$$

During model training, embodiments utilized three signals to guide the training of the NNAFC module, specifically, the loss function is defined as the mean absolute error (MAEC) of three signals:

$$\text{Loss} = \lambda_1 MAE(\hat{V}, V) + \lambda_2 MAE(\widehat{MH_s}, MH_s) + \lambda_3 MAE(\widehat{V_1 H_s}, V_1 H_s) \quad \text{Eq. (24)}$$

where $\lambda_1$, $\lambda_2$, $\lambda_3$ are the values for controlling the weights of each loss component.

This detailed approach ensures effective feedback suppression while preserving the quality of the original vocal signal. The NNAFC module's ability to handle both music and playback vocal components using a progressive feedback cancellation strategy is key to its performance.

More particularly, the embodiments described herein address the combined challenges of acoustic echo cancellation, acoustic howling suppression, noise reduction. The features herein utilize, according to embodiments, a hybrid approach that integrates traditional frequency-domain Kalman filter (FDKF) techniques with advanced neural network (NN) based methods to achieve superior audio clarity and stability. This innovative solution is designed to improve the overall user experience in hands-free Karaoke systems by effectively managing the complex interplay of various acoustic artifacts and enhancing the quality of the reproduced sound.

In other words, to overcome challenges described above, there is provided herein a novel hybrid method that combines frequency-domain Kalman filter (FDKF) techniques with advanced neural network (NN) based methods. This integrated approach leverages the strengths of both traditional and modern techniques, providing a robust solution for enhancing audio quality in hands-free Karaoke systems. By addressing the joint problems of acoustic echo cancellation, howling suppression, and noise reduction, the embodiments deliver a superior user experience, ensuring clear and stable audio output in hands-free Karaoke environments.

According to embodiments, Karaoke includes one or more persons singing along to displayed lyrics and reproduced corresponding sounds, and hands-free Karaoke, as opposed to other Karaoke in which a microphone may be held in the singer person's or persons' hand(s), is instead hands-free such that the microphone need not be held in hand but instead simply near enough to pick up the singer's voice; this is referred to as a "hands-free Karaoke" environment, system, or the like. Exemplary embodiments herein are implemented in such hands-free Karaoke environment.

The techniques described above, can be implemented as computer software using computer-readable instructions and physically stored in one or more computer-readable media or by a specifically configured one or more hardware processors. For example, FIG. 14 shows a computer system 1400 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
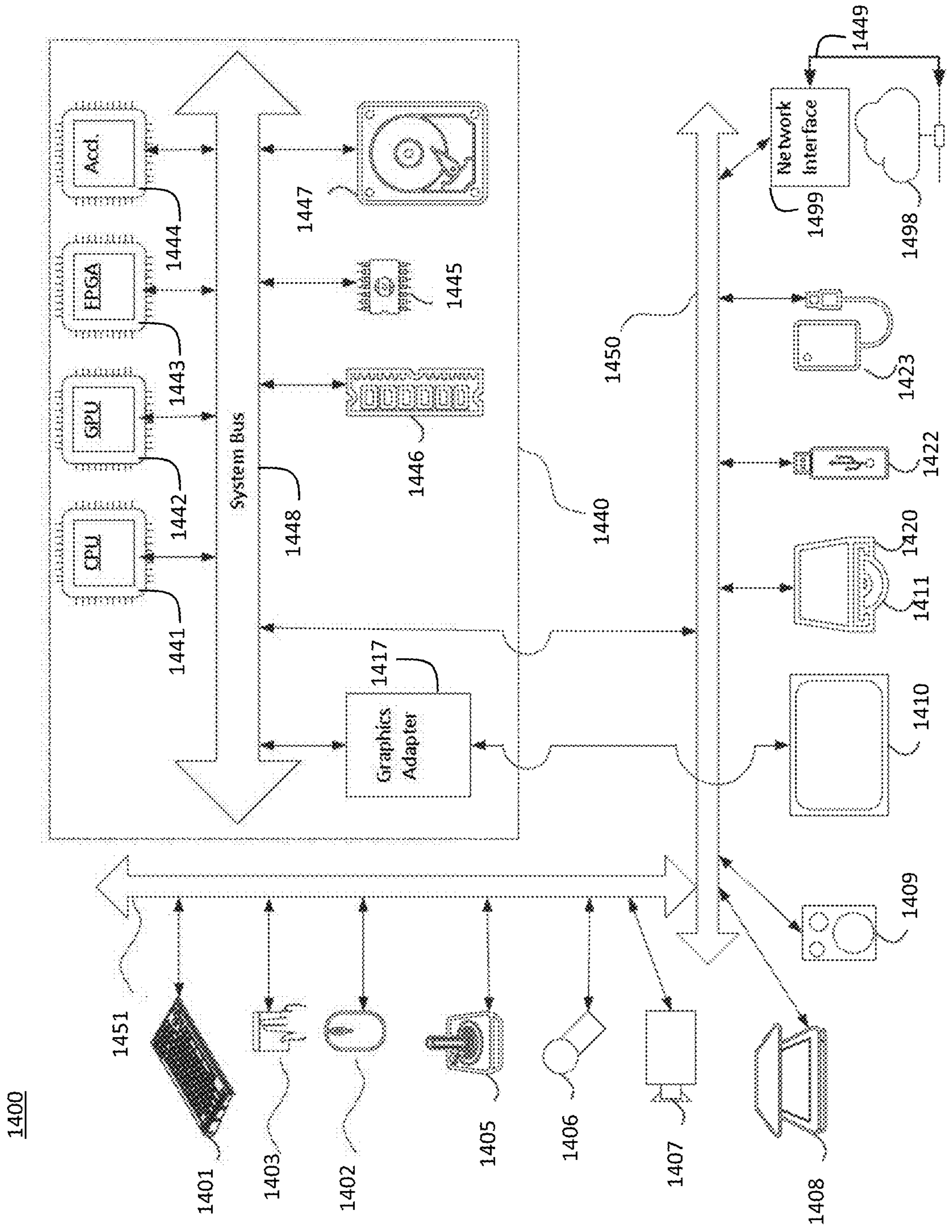
FIG. 14 is a simplified illustration of components of a computer system in accordance with embodiments.

The components shown in FIG. 14 for computer system 1400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1400.

Computer system 1400 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1401, mouse 1402, trackpad 1403, touch screen 1410, joystick 1405, microphone 1406, scanner 1408, camera 1407.

Computer system 1400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1410, or joystick 1405, but there can also be tactile feedback devices that do not serve as input devices), audio output devices (such as: speakers 1409, headphones (not depicted)), visual output devices (such as screens 1410 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1400 can also include human accessible storage devices and their associated media such as optical media including CD/DVD ROM/RW 1420 with CD/DVD 1411 or the like media, thumb-drive 1422, removable hard drive or solid state drive 1423, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1400 can also include interface 1499 to one or more communication networks 1498. Networks 1498 can for example be wireless, wireline, optical. Networks 1498 can further be local, wide-area, metropolitan, vehicular and industrial, real-time, delay-tolerant, and so on. Examples of networks 1498 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1498 commonly require external network interface adapters that attached to certain general-purpose data ports or peripheral buses (1450 and 1451) (such as, for example USB ports of the computer system 1400; others are commonly integrated into the core of the computer system 1400 by attachment to a system bus as described below (for example Ethernet interface into a PC computer system or cellular network interface into a smartphone computer system). Using any of these networks 1498, computer system 1400 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1440 of the computer system 1400.

The core 1440 can include one or more Central Processing Units (CPU) 1441, Graphics Processing Units (GPU) 1442, a graphics adapter 1417, specialized programmable processing units in the form of Field Programmable Gate Areas (FPGA) 1443, hardware accelerators for certain tasks 1444, and so forth. These devices, along with Read-only memory (ROM) 1445, Random-access memory 1446, internal mass storage such as internal non-user accessible hard drives, SSDs, and the like 1447, may be connected through a system bus 1448. In some computer systems, the system bus 1448 can be accessible in the form of one or more physical plugs to enable extensions by additional CPUs, GPU, and the like. The peripheral devices can be attached either directly to the core's system bus 1448, or through a peripheral bus 1449. Architectures for a peripheral bus include PCI, USB, and the like.

CPUs 1441, GPUs 1442, FPGAs 1443, and accelerators 1444 can execute certain instructions that, in combination, can make up the aforementioned computer code. That computer code can be stored in ROM 1445 or RAM 1446. Transitional data can be also be stored in RAM 1446, whereas permanent data can be stored for example, in the internal mass storage 1447. Fast storage and retrieval to any of the memory devices can be enabled through the use of cache memory, that can be closely associated with one or more CPU 1441, GPU 1442, mass storage 1447, ROM 1445, RAM 1446, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1400, and specifically the core 1440 can provide functionality as a result of processor(s) (including CPU, GPUs, FPGA, accelerators, and the like) executing software embodied in one or more tangible, computer-readable media. Such computer-readable media can be media associated with user-accessible mass storage as introduced above, as well as certain storage of the core 1440 that are of non-transitory nature, such as core-internal mass storage 1447 or ROM 1445. The software implementing various embodiments of the present disclosure can be stored in such devices and executed by core 1440. A computer-readable medium can include one or more memory devices or chips, according to particular needs. The software can cause the core 1440 and specifically the processors therein (including CPU, GPU, FPGA, and the like) to execute particular processes or particular parts of particular processes described herein, including defining data structures stored in RAM 1446 and modifying such data structures according to the processes defined by the software. In addition or as an alternative, the computer system can provide functionality as a result of logic hardwired or otherwise embodied in a circuit (for example: accelerator 1444), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of target vocal enhancement, the method performed by at least one processor and comprising:

receiving an audio signal obtained from a microphone;

inputting the audio signal into frequency-domain Kalman filter (FDKF);

inputting the audio signal and an output from the FDKF into a neural network;

estimating, based on the audio signal and the output from the FDKF, and removing feedback signals from the audio signal by the neural network; and outputting a version of the audio signal in which a target vocal signal is enhanced by removal of the feedback signals from the audio signal by the neural network, wherein the output from the FDKF is a version of the audio signal in which acoustic feedback cancellation (AFC) is implemented by iterative feedback to the FDKF in which the target vocal signal is estimated by short-time Fourier transform (STFT) and used by the FDKF to update filter weights of the FDKF, wherein the neural network implements a neural network adaptive feedback cancellation (NNAFC) based on STFT domain versions of the audio signal, the output from the FDKF, and a reference music signal, and wherein the NNAFC comprises a two-layer Long Short-Term Memory (LSTM) network configured to estimate and suppress music and playback components in the audio signal based on at least two ratio masks.

2. The method according to claim 1, wherein the audio signal is obtained from the microphone in a hands-free Karaoke environment.

3. The method according to claim 1, wherein the FDKF further, in outputting the output from the FDKF, implements STFT on the audio signal and an error signal estimated based on the target vocal signal.

4. The method according to claim 1, wherein at least one of the at least two ratio masks receives an output from an other of the at least two ratio masks.

5. An apparatus for target vocal enhancement, the apparatus comprising:

at least one memory configured to store computer program code;

at least one processor configured to access the computer program code and operate as instructed by the computer program code, the computer program code including:

receiving code configured to cause the at least one processor to receive an audio signal obtained from a microphone;

inputting code configured to cause the at least one processor to input the audio signal into frequency-domain Kalman filter (FDKF);

further inputting code configured to cause the at least one processor to input the audio signal and an output from the FDKF into a neural network;

estimating code configured to cause the at least one processor to estimate, based on the audio signal and the output from the FDKF, and remove feedback signals from the audio signal by the neural network; and outputting code configured to cause the at least one processor to output a version of the audio signal in which a target vocal signal is enhanced by removal of the feedback signals from the audio signal by the neural network, wherein the output from the FDKF is a version of the audio signal in which acoustic feedback cancellation (AFC) is implemented by iterative feedback to the FDKF in which the target vocal signal is estimated by short-time Fourier transform (STFT) and used by the FDKF to update filter weights of the FDKF, wherein the neural network implements a neural network adaptive feedback cancellation (NNAFC) based on STFT domain versions of the audio signal, the output from the FDKF, and a reference music signal, and wherein the NNAFC comprises a two-layer Long Short-Term Memory (LSTM) network configured to estimate and suppress music and playback components in the audio signal based on at least two ratio masks.

6. The apparatus according to claim 5, wherein the audio signal is obtained from the microphone in a hands-free Karaoke environment.

7. The apparatus according to claim 5, wherein the FDKF further, in outputting the output from the FDKF, implements STFT on the audio signal and an error signal estimated based on the target vocal signal.

8. The apparatus according to claim 5, wherein at least one of the at least two ratio masks receives an output from an other of the at least two ratio masks.

9. A non-transitory computer readable medium storing a program causing a computer to:

receive an audio signal obtained from a microphone;

input the audio signal into frequency-domain Kalman filter (FDKF);

input the audio signal and an output from the FDKF into a neural network;

estimate, based on the audio signal and the output from the FDKF, and removing feedback signals from the audio signal by the neural network; and output a version of the audio signal in which a target vocal signal is enhanced by removal of the feedback signals from the audio signal by the neural network, wherein the output from the FDKF is a version of the audio signal in which acoustic feedback cancellation (AFC) is implemented by iterative feedback to the FDKF in which the target vocal signal is estimated by short-time Fourier transform (STFT) and used by the FDKF to update filter weights of the FDKF, wherein the neural network implements a neural network adaptive feedback cancellation (NNAFC) based on STFT domain versions of the audio signal, the output from the FDKF, and a reference music signal, and wherein the NNAFC comprises a two-layer Long Short-Term Memory (LSTM) network configured to estimate and suppress music and playback components in the audio signal based on at least two ratio masks.

10. The non-transitory computer readable medium according to claim 9, wherein the audio signal is obtained from the microphone in a hands-free Karaoke environment.

11. The non-transitory computer readable medium according to claim 9, wherein the FDKF further, in outputting the output from the FDKF, implements STFT on the audio signal and an error signal estimated based on the target vocal signal.

* * * * *